(12) United States Patent
Ozalevli

(10) Patent No.: US 11,863,058 B2
(45) Date of Patent: Jan. 2, 2024

(54) SWITCHING POWER CONVERTER WITH MODE TRANSITION CONTROL

(71) Applicant: Apple Inc., Cupertino, CA (US)

(72) Inventor: Erhan Ozalevli, Foster City, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 17/484,941

(22) Filed: Sep. 24, 2021

(65) Prior Publication Data

US 2023/0108239 A1   Apr. 6, 2023

(51) Int. Cl.
H02M 3/158  (2006.01)
H02M 1/00   (2006.01)

(52) U.S. Cl.
CPC ....... H02M 1/0032 (2021.05); H02M 1/0009 (2021.05); H02M 1/0025 (2021.05); H02M 3/158 (2013.01)

(58) Field of Classification Search
CPC .. H02M 3/158; H02M 1/0009; H02M 1/0032; H02M 3/156; H02M 1/0025
See application file for complete search history.

(56) References Cited

U.S. PATENT DOCUMENTS

| | | | |
|---|---|---|---|
| 8,000,117 B2 | 8/2011 | Petricek | |
| 8,035,365 B2 | 10/2011 | Kikuchi | |
| 9,496,799 B2 | 11/2016 | Goetz et al. | |
| 9,819,268 B2 | 11/2017 | Thomas et al. | |
| 9,893,684 B2 | 2/2018 | Lehtola | |
| 10,186,959 B2 | 1/2019 | Tamegai et al. | |
| 10,483,849 B1* | 11/2019 | Saleem | H02M 3/1584 |
| 10,601,318 B2 | 3/2020 | Flaibani et al. | |
| 10,811,978 B1 | 10/2020 | Zheng et al. | |
| 10,868,429 B2 | 12/2020 | Li et al. | |
| 2007/0025048 A1* | 2/2007 | Gokita | H02M 3/156 361/160 |
| 2015/0349636 A1* | 12/2015 | Bodano | H02M 1/32 323/271 |
| 2021/0242780 A1* | 8/2021 | Pahkala | H03K 7/08 |
| 2021/0273562 A1* | 9/2021 | Ozalevli | H02M 3/158 |

* cited by examiner

*Primary Examiner* — Alex Torres-Rivera
(74) *Attorney, Agent, or Firm* — Kowert, Hood, Munyon, Rankin & Goetzel, P.C.; Erik A. Heter; Dean M. Munyon

(57) ABSTRACT

A power converter circuit is disclosed. In one embodiment, the power converter includes a switching circuit coupled to an input power supply node and a regulated power supply node via an inductor, wherein the switching circuit is configured to source respective charge current to the regulated power supply node during a plurality of active cycles. The power converter further includes a control circuit configured to determine, for a particular active cycle, an average inductor current. The control circuit is further configured to perform a comparison of the average inductor current to a threshold value. Based on results of the comparison, the control circuit is configured to deactivate the switching circuit for a different active cycle subsequent to the particular active cycle. Two methods are disclosed to identify mode transitions, depending on conditions such as minimum time on and discontinuous current mode.

20 Claims, 15 Drawing Sheets

SWITCHING POWER CONVERTER WITH MODE TRANSITION CONTROL

BACKGROUND

Technical Field

This disclosure is directed to electronic circuits and, more particularly, to switching power converters.

Description of the Related Art

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator circuit and/or power converter circuits configured to generate regulated voltage levels for various power supply signals. Such power converter circuits may employ a regulator circuit that includes both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include two switches (also referred to as "power switches") and a switch node that is coupled to a regulated power supply node via an inductor. One switch is coupled between an input power supply node and the switch node and is referred to as the "high-side switch." Another switch is coupled between the switch node and a ground supply node, and is referred to as the "low-side switch."

When the high-side switch is closed, energy is applied to the inductor, allowing the current through the inductor to increase. Such a time period may be referred to as an "on-time period" or a "charge period." During one of these time periods, the inductor stores energy in the form of a magnetic field. When the high-side switch is opened and the low-side switch is closed, energy is no longer being applied to the inductor, and the voltage across the inductor reverses. During these periods, which may be referred to as "off-time periods", the inductor functions as a current source, with the energy stored in the inductor's magnetic field supporting the current flowing into the load. The process of closing and opening the high-side and low-side switches is performed periodically to maintain a desired voltage level on the power supply node.

SUMMARY

A power converter circuit is disclosed. In one embodiment, the power converter includes a switching circuit coupled to an input power supply node and a regulated power supply node via an inductor, wherein the switching circuit is configured to source respective charge current to the regulated power supply node during a plurality of active cycles. The power converter further includes a control circuit configured to determine, for a particular active cycle, an average inductor current. The control circuit is further configured to perform a comparison of the average inductor current to a threshold value. Based on results of the comparison, the control circuit is configured to deactivate the switching circuit for a different active cycle subsequent to the particular active cycle.

BRIEF DESCRIPTION OF THE DRAWINGS

The following detailed description makes reference to the accompanying drawings, which are now briefly described.

DETAILED DESCRIPTION OF EMBODIMENTS

Figure 1:
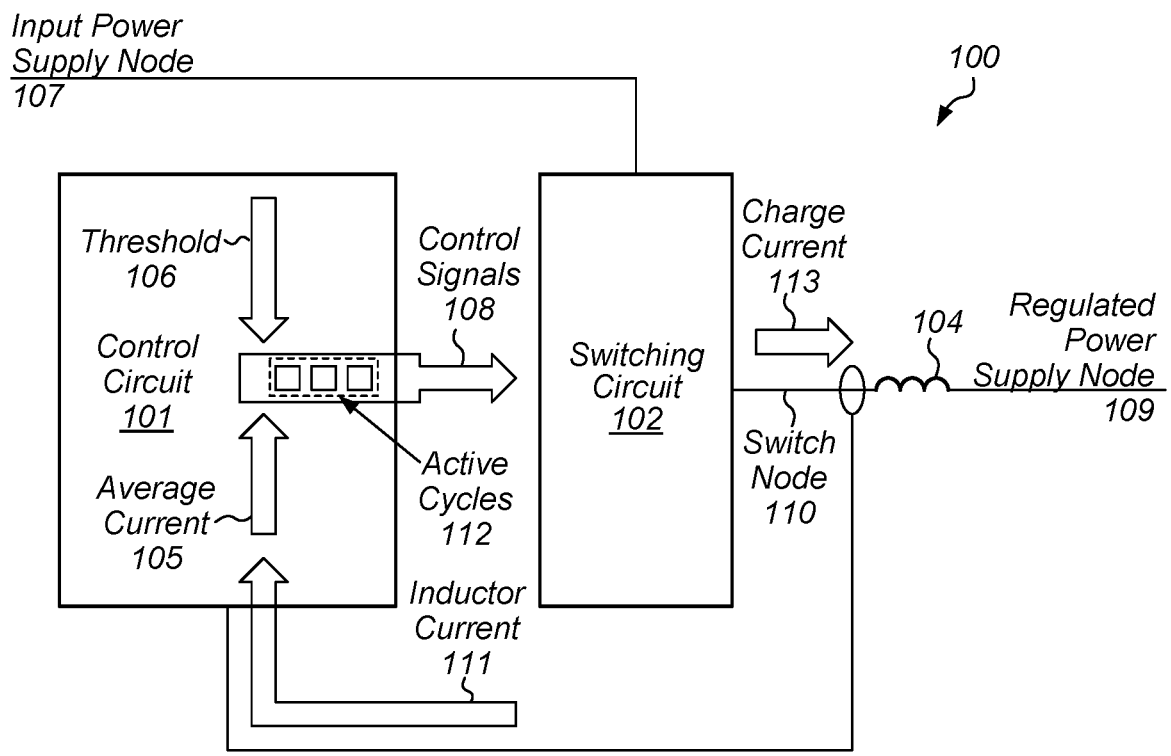
FIG. 1 is a block diagram of an embodiment of a power converter circuit for a computer system.

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator and/or power converter circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a power or buck converter circuit. Such power converter circuits include multiple switches (also referred to as "power switches") and a switch node that is coupled to a regulated power supply node via an inductor. One switch is coupled between an input power supply node and the switch node and is referred to as the "high-side switch." Another switch is coupled between the switch node and a ground supply node and is referred to as the "low-side switch."

When the high-side switch is closed (referred to as "on-time"), energy is applied to the inductor, resulting in an increase in the current flowing through the inductor. During this time, the inductor stores energy in the form of a magnetic field in a process referred to as "magnetizing" the inductor. When the high-side switch is opened and the low-side switch is closed, energy is no longer being applied to the inductor and the voltage across the inductor reverses, which results in the inductor functioning as a current source with the energy stored in the inductor's magnetic field supporting the current flowing into the load. The process of closing and opening the high-side and low-side switches is performed periodically to maintain a desired voltage level on the power supply node.

The power switches included in buck converters may be operated in different modes. In some cases, a buck converter may employ pulse width modulation (PWM), in which the frequency with which the power converter circuit cycles is fixed, but the period of time that the high-side switch is closed is adjusted based on a comparison of an output voltage of the buck converter to a reference voltage. In other cases, a power converter circuit may employ pulse frequency modulation (PFM), in which the frequency with which the buck converter cycles (including on-time, off-time, and idle time) is adjusted based on the load current.

When current flows through the inductor during each active cycle, a power converter circuit is said to be operating in continuous conduction mode (or "CCM"). Alternatively, when there is not current flowing during one or more of the active cycles, the power converter circuit is said to be operating in discontinuous conduction mode (or "DCM").

As load current changes, a power converter circuit may switch modes of operation in order to efficiently provide the desired voltage level on a regulated power supply node. In some cases, dual regulation modes may be employed. For example, PWM mode may be combined with pulse skipping mode (PSM), PFM mode, or burst mode, to accommodate varying load current ranges. During such transitions in regulation mode, a power converter may experience a loss in efficiency due to different criteria that affect the switching between regulation modes. For example, if a threshold is set to high for transitions from PFM to PWM operation, the power converter circuit can skip clock cycles, which can increase inductor current ripple. Such inductor current ripple can translate to increased ripple on the regulated power supply node, possible affecting the operation of load circuits.

The embodiments illustrated in the drawings and described below may provide techniques for a power converter circuit to determine an average current delivered to the load during each cycle and using this information to adjust the switching frequency. By using the average current delivered to the load to adjust the switching frequency, efficiency of the power converter circuit may be maintained through transitions in regulation mode, thereby preventing spurious clock cycle skips and increases in inductor current ripple.

A block diagram of a power converter circuit is depicted in FIG. 1. As illustrated, power converter circuit 100 includes control circuit 101, switching circuit 102, and inductor 104.

Switching circuit 102 is coupled to input power supply node 107 and inductor 104 via switch node 110. Inductor 104 is further coupled to regulated power supply node 109. Switching circuit 102 is configured to source charge current 113 to regulated power supply node 109 via inductor 104 during active cycles 112.

As described below, during an active cycle, a high-side switch included in switching circuit 102 may be activated allowing charge current 113 to flow from input power supply node 107 into switch node 110, through inductor 104, and into regulated power supply node 109. As charge current 113 flows into regulated power supply node 109, energy is stored in the magnetic field of inductor 104. When an active cycle is halted, the high-side switch is de-activated and a low-side switch included in switching circuit 102 is activated, coupling switch node 110 to a ground supply node. While switch node 110 is coupled to ground, inductor 104 continues to source current to regulated power supply node 109 using the energy stored in its magnetic field.

In various embodiments, control circuit 101 is also configured to generate control signals 108, which are used to initiate and halt active cycles 112. Control signals 108 may be generated differently in various regulation modes. As described below, control circuit 101 may be further configured to switch regulation modes based on comparisons of the voltage level to various threshold values or other determined values.

As part of switching regulation modes, control circuit 101 is configured to determine average inductor current 105 for a particular one of active cycles 112. In some embodiments, control circuit 101 is also configured to perform a comparison of average inductor current 105 to threshold 106 and, based on a result of the comparison, deactivate switching circuit 102 for a different active cycle of active cycles 112 that is subsequent to the particular active cycle. By deactivating various ones of active cycles 112 using average inductor current 105, control circuit 101 can switch between PWM and PSM modes on a cycle-by-cycle basis, allowing a rapid response to load transients.

Figure 2:
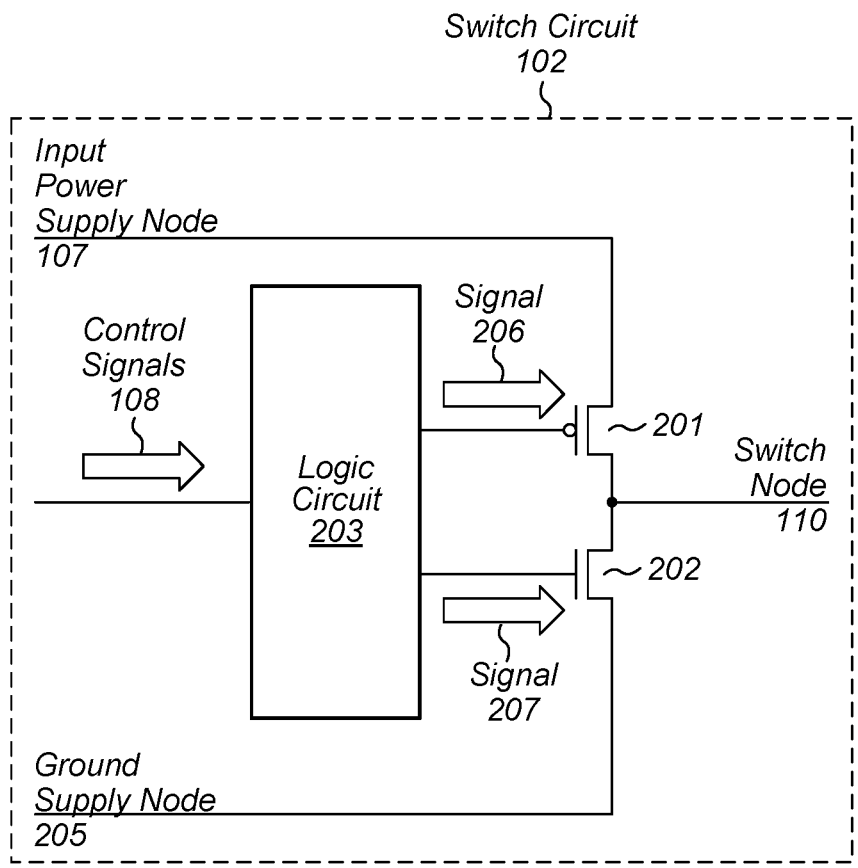
FIG. 2 is a block diagram of an embodiment of a switch circuit included in a power converter circuit.

Turning to FIG. 2, a block diagram of an embodiment of switch circuit 102 is depicted. As illustrated, switch circuit 102 includes devices 201 and 202, and logic circuit 203.

Device 201 is coupled between input power supply node 107 and switch node 110, and is controlled by signal 206. In a similar fashion, device 202 is coupled between switch node 110 and ground supply node 205, and is controlled by signal 207. In various embodiments, device 201 may be implemented as a p-channel metal-oxide semiconductor field-effect transistor (MOSFET), Fin field-effect transistor (FinFET), gate-all-around field-effect transistor (GAAFET), or any other suitable transconductance device. Device 202 may, in other embodiments, be implemented as an n-channel MOSFET, FinFET, GAAFET, or any other suitable transconductance device.

In response to an activation of signal 206, device 201 is configured to couple input power supply node 107 to switch node 110, allowing current to flow into switch node 110 and then into inductor 104, thereby magnetizing inductor 104. In response to an activation of signal 207, device 202 is configured to couple switch node 110 to ground supply node 205. With switch node 110 coupled to ground supply node 205, energy is no longer being supplied to inductor 104, causing the magnetic field of inductor 104 to collapse. As the magnetic field collapses, inductor 104 functions as a current source, providing current to regulated power supply node 109.

Logic circuit 203 is configured to generate signal 206 and signal 207 using control signals 108. In various embodiments, logic circuit 203 may be configured, in response to an activation of control signal 108, to activate signal 206 and deactivate signal 207. Logic circuit 203 may be further configured, in response to a deactivation of control signals 108, to deactivate signal 206 and activate signal 207. In some embodiments, logic circuit 203 may include any suitable combination of logic gates, sequential logic circuit elements, MOSFETs, FinFETs, GAAFETs, or any other suitable transconductance devices.

As used herein, when a signal is activated, it is set to a logic or voltage level that activates a load circuit or device. The logic level may be either a high logic level or a low logic level depending on the load circuit. For example, an active state of a signal coupled to a p-channel MOSFET is a low logic level (referred to as an "active low signal"), while an active state of a signal coupled to an n-channel MOSFET is a high logic level (referred to as an "active high signal").

Figure 3:
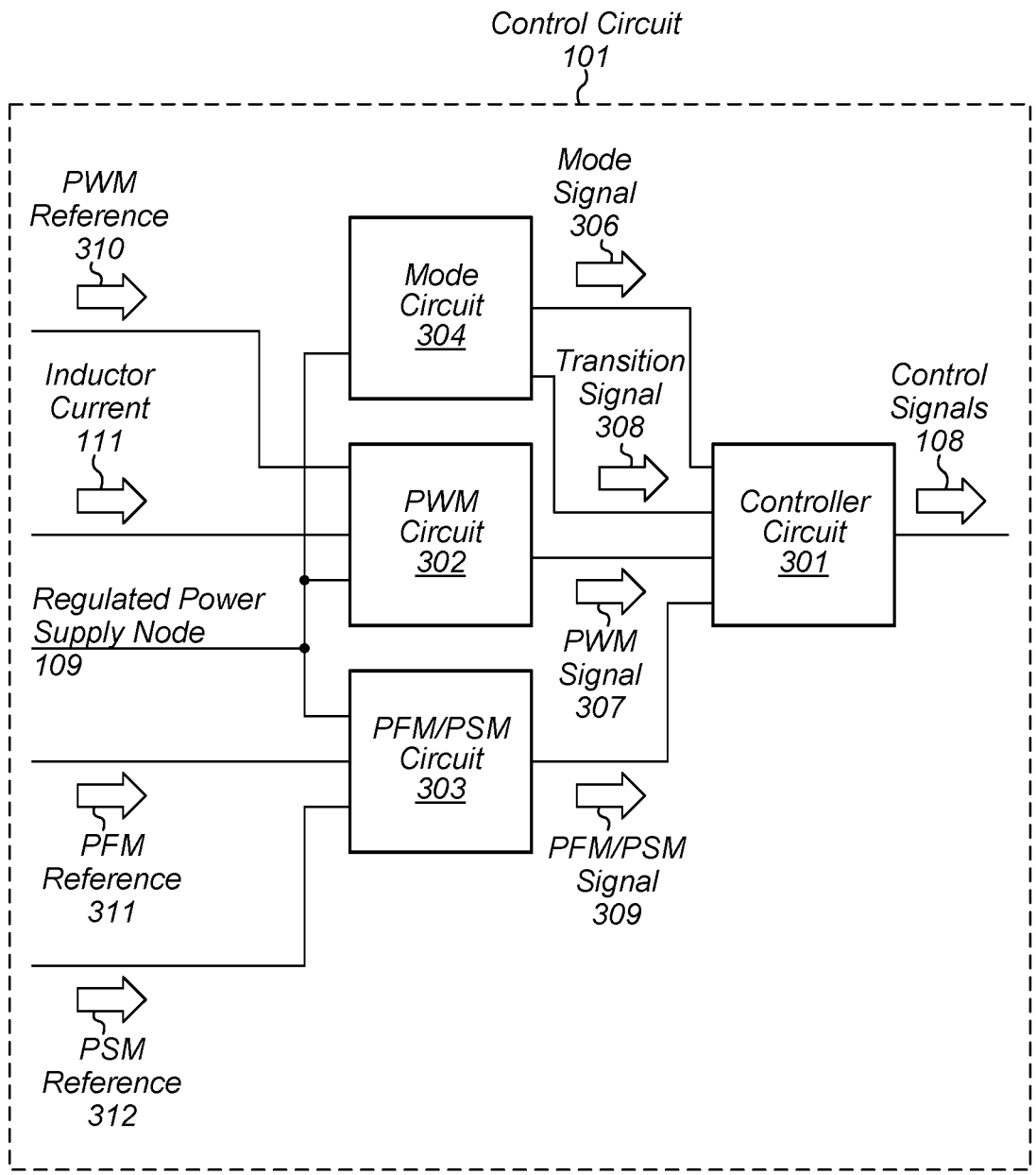
FIG. 3 is a block diagram of an embodiment of a control circuit for a power converter circuit.

Turning to FIG. 3, a block diagram of an embodiment of control circuit 101 is depicted. As illustrated, control circuit 101 includes controller circuit 301, a pulse width modulation circuit (denoted as "PWM circuit 302"), a pulse frequency modulation circuit (denoted as "PFM circuit 303"), and mode circuit 304.

Controller circuit 301 is configured to generate controls signals 108 using mode signal 306, PWM signal 307, transition signal 308, and PFM signal 309. In various embodiments, controller circuit 301 may be configured to activate control signals 108 in response to a determination that PFM signal 309 has been activated. Additionally, controller circuit 301 may be further configured to de-activate and re-activate control signals 108 based on a value of PWM signal 307. In other embodiments, controller circuit 301 may be configured to override the effect of PWM signal 307 using skip signal 308. For example, if PWM signal 307 is activated to begin a new charge cycle, controller circuit 301 may not initiate the new charge cycle in response to a determination that skip signal 308 has been activated. In various embodiments, controller circuit 301 may be implemented using any suitable combination of combinatorial and sequential logic circuits.

PWM circuit 302 is configured to generate PWM signal 307 using inductor current 111 and a voltage level of regulated power supply node 109. As described below, PWM circuit 302 is configured to compare the voltage level of regulated power supply node to PWM reference 507 to generate an error signal. PWM circuit 302 may, in various embodiments, be configured to sense inductor current 111 using a voltage level of switch node 110, and then compare a slope-compensated version of the sensed inductor current to the error signal to generate PWM signal 307.

PFM/PSM circuit 303 is configured to generate PFM/PSM signal 309 using the voltage level of regulated power supply node 109, PFM reference 311, and PSM reference 312. When power converter circuit 100 is operating in PFM mode, PFM/PSM circuit 303 is configured to compare the voltage level of regulated power supply node 109 to PFM reference 311 to generate PFM/PSM signal 309. When power converter circuit 100 is operating in PSM mode, PFM/PSM circuit 303 is configured to compare the voltage of regulated power supply node 109 to PSM reference 312. In various embodiments, PFM reference 311 and PSM reference 312 are greater than PWM reference 310, to keep an error signal generated in PWM circuit 302 at a minim voltage level during PFM or PSM operation. If the voltage reference of PWM and PFM/PSM modes were to be the same, a voltage level of the error signal could go high at a light load condition. This may push the PWM comparator to produce wider pulses, thereby causing PWM mode to take over and cause the switching regulator to oscillate between PWM and PFM (or PWM and PSM).

Mode circuit 304 is configured to generate mode signal 306 and transition signal 308. The two signals are, in various embodiments, used independently of each other to control mode transitions in power converter circuit 100.

To generate transition signal 308, mode circuit 304 is further configured to generate an average inductor current. In various embodiments, the average current can be used to control transitions between PWM operation and PFM operation (or PWM operation and PSM operation). It is noted that power converter circuit 100 may be configured to operate in PWM and PFM operation modes, or PWM and PSM operation modes. In some embodiments, when power converter circuit 100 is switching between PWM and PSM operation modes, transition signal 308 may additionally be used to selectively skip particular active cycles during PSM operation.

To generate mode signal 306, mode circuit 304 is further configured to detect durations of on-time periods as well as DCM operation. Based on the values of the detected on-time periods or the detection of DCM operation, mode circuit 304 may activate or de-active mode signal 306 which can cause controller circuit 301 to generate control signals 108 according to different ones of the operation modes.

For example, in various embodiments, mode circuit 304 is configured, in response to a detection of DCM operation or short minimum on-times, to change the state mode signal 306 to cause power converter circuit 100 to exit PWM operation and enter PFM operation (or PSM operation). In other embodiments, mode circuit 304 is configured, in response to detection of long minimum on-times, change the state of mode signal 306 to cause power converter circuit 100 to exit PFM (or PSM) operation and enter PWM operation.

Although mode signal 306 and transition signal 308 are depicted as single wires, in some cases, both mode signal 306 and transition signal 308 may include multiple bits of information transmitted using multiple wires. In various embodiments, mode circuit 304 may be implemented using a state machine or other suitable sequential logic circuit, a microcontroller, or as a general-purpose processor configured to execute software or program instructions.

Figure 4:
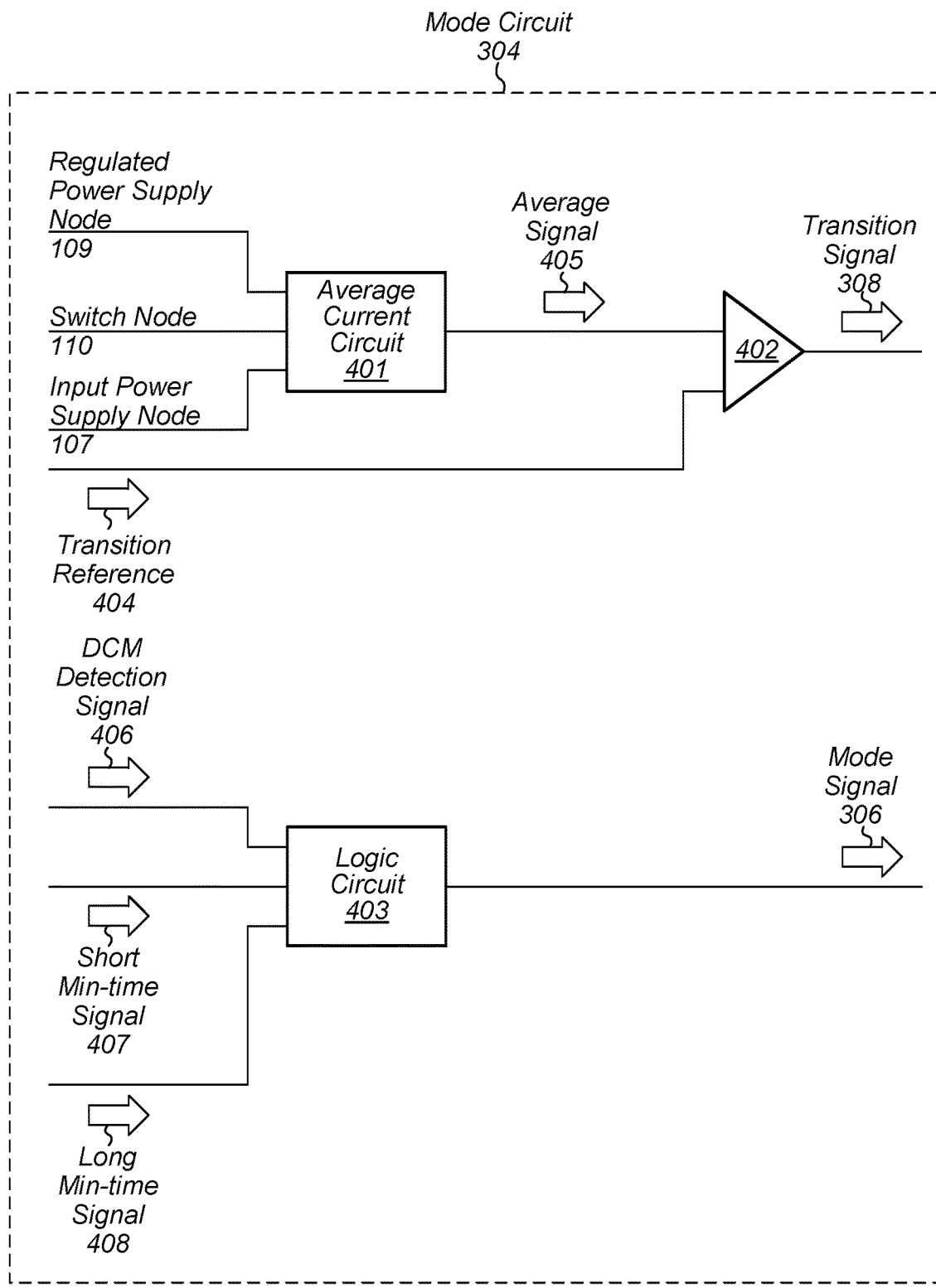
FIG. 4 is a block diagram of an embodiment of a mode circuit.

Turning to FIG. 4, a block diagram of an embodiment of mode circuit 304 is depicted. As illustrated, mode circuit 304 includes average current circuit 401, comparator 402, and logic circuit 403.

Average current circuit 401 is configured to generate average signal 405 using the voltage level of regulated power supply node 109, the on-time of switch node 110, and the voltage level of input power supply node 107. In various embodiments, average signal 405 corresponds to an average inductor current during a given active cycle of a plurality of active cycles being performed when power converter circuit 100 is operating in PWM regulation mode.

Comparator 402 is configured to generate transition signal 308 using average signal 513 and skip reference 404. To generate transition signal 308, comparator 402 may be further configured to perform a comparison of average signal 513 and skip reference 404, and determine a value for transition signal 308 based on a result of the comparison. In some embodiments, comparator 402 is configured to activate transition signal 308 in response to a determination that average signal 513 is less than transition reference 404. In various embodiments, comparator 402 may be implemented as a Schmitt trigger circuit or any other suitable type of comparator circuit configured to generate a digital output signal based on a comparison of at least two analog voltage levels.

Logic circuit 402 is configured to generate mode signal 306 using DCM detection signal 406, short min-time signal 407, and long min-time signal 408. In various embodiments, DCM detection signal 406 may be activated in response to a detection of DCM operation. In some cases, DCM detection signal 406 may be generated by detecting zero crossings of inductor current 111. In various embodiments, short min-time signal 407 is a threshold for a minimum on-time of an active cycle during PWM operation. In a similar fashion, long min-time signal 408 is a threshold for PWM comparator output (307) on-time to decide when to transition to PWM. By using different thresholds for the different operating modes, there is hysteresis between the transition between PFM and PWM operation to prevent oscillation between the operation modes (referred to as "mode chattering").

In various embodiments, logic circuit 402 is configured to set mode signal 306 to a value that causes power converter circuit 100 to exit PWM operation mode and enter PFM (or PSM) in response to an activation of DCM detection signal 406 and a determination that an active cycle satisfies the threshold of short min-time signal 407. In other embodiments, logic circuit 402 is configured to set mode signal 306 to a value that causes power converter circuit 100 to exit PFM (or PSM) mode, and enter PWM mode in response to a determination that the error signal generated by PWM circuit 302 activates after the threshold specified by long min-time signal 408. Logic circuit 402 may, in various embodiments, be implemented a state machine or other suitable sequential logic circuit, a microcontroller, or as a general-purpose processor configured to execute software or program instructions.

Figure 5:
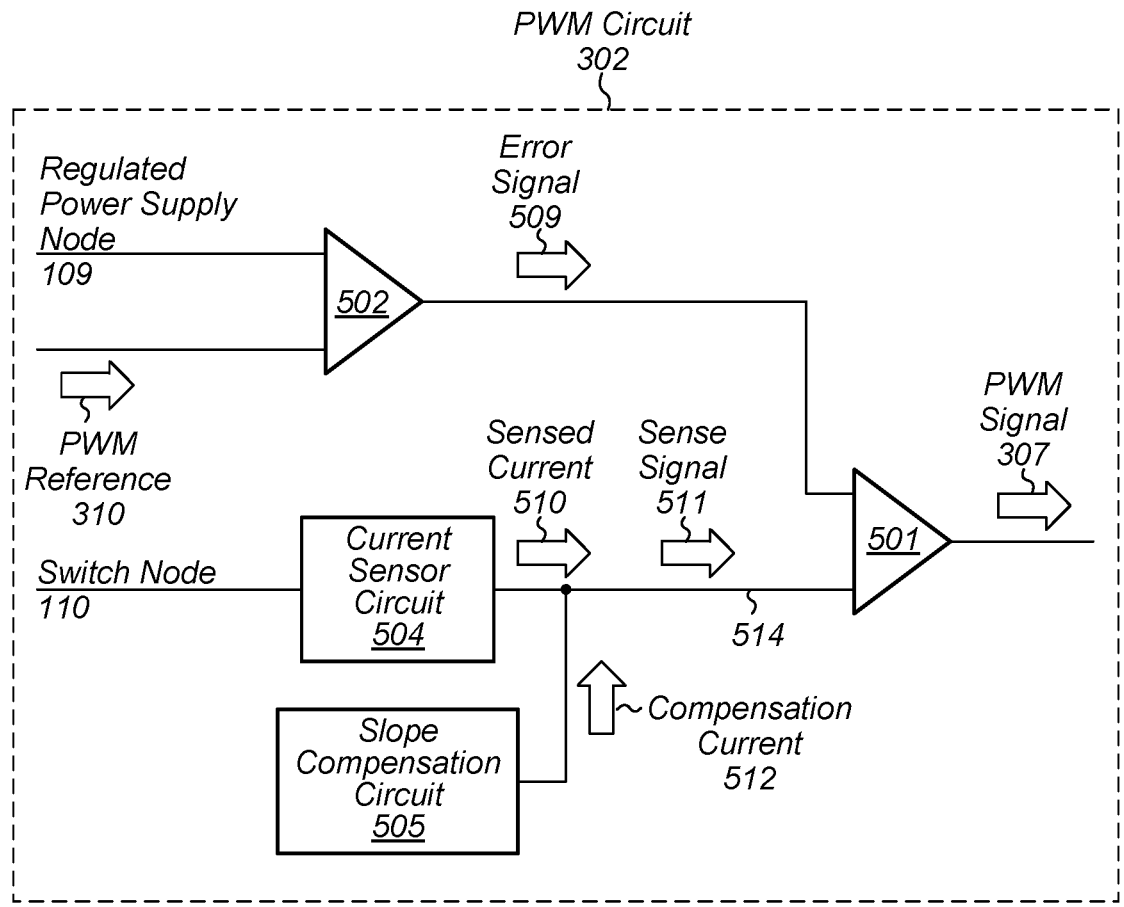
FIG. 5 is a block diagram of an embodiment of a pulse width modulation control circuit.

Turning to FIG. 5, a block diagram of an embodiment of PWM circuit 302 is depicted. As illustrated, PWM circuit 302 includes comparators 501-502, current sensor circuit 504, and slope compensation circuit 505.

Comparator circuit 502 is configured generate error signal 509 using a voltage level of regulated power supply node 109 and PWM reference 507. To generate error signal 509, comparator circuit 502 may be configured to compare the voltage level of regulated power supply node 109 and PWM reference 507, and determine a voltage level of error signal 509 based on a result of the comparison. In some embodiments, a voltage level of error signal 509 may be proportional to a difference between the voltage level of regulated power supply node 109 and PWM reference 507. It is noted that PWM reference 507 may be a different value than PFM reference 402 as depicted in FIG. 4. In various embodiments, comparator circuit 502 may be implemented using a differential amplifier circuit or any suitable amplifier circuit configured to generate an output signal whose voltage level is based on the respective voltage levels of at least two input signals.

Current sensor circuit 504 is configured to generate sensed current 510 using a voltage level of switch node 110. As describe below, current sensor circuit 504 may be configured to compare the voltage level of switch node 110 to a voltage across a device that is a replica of switch device 201.

Slope compensation circuit 505 is configured to generate compensation current 512. As described below, slope compensation circuit 505 may be configured to generate compensation current 512 such that it is a periodic current ramp. It is noted that slope compensation is used to improve the stability of power converter circuit 100 by increasing a frequency at which a feedback loop of power converter circuit 100 can operate, thereby improving a response of power converter circuit 100 to transients in load current demand.

Sensed current 510 and compensation current 512 are combined on node 514 to generate sense signal 511. In various embodiments, node 514 is coupled to a ground supply node via a resistor (not shown), and as sensed current 510 and compensation current 512 flow into the ground supply node via the resistor, the voltage drop across the resistor corresponds to sense signal 511.

Comparator 501 is configured to generate PWM signal 307 using error signal 509 and sense signal 511. In various embodiments, comparator 501 may be configured to activate PWM signal 307 in response to a determination that a voltage level of sense signal 511 is less than a voltage level of error signal 509. Comparator 501 may, in some embodiments, be implemented as a Schmitt trigger circuit or any other suitable type of comparator circuit configured to generate a digital output signal based on a comparison of at least two analog voltage levels.

Figure 6:
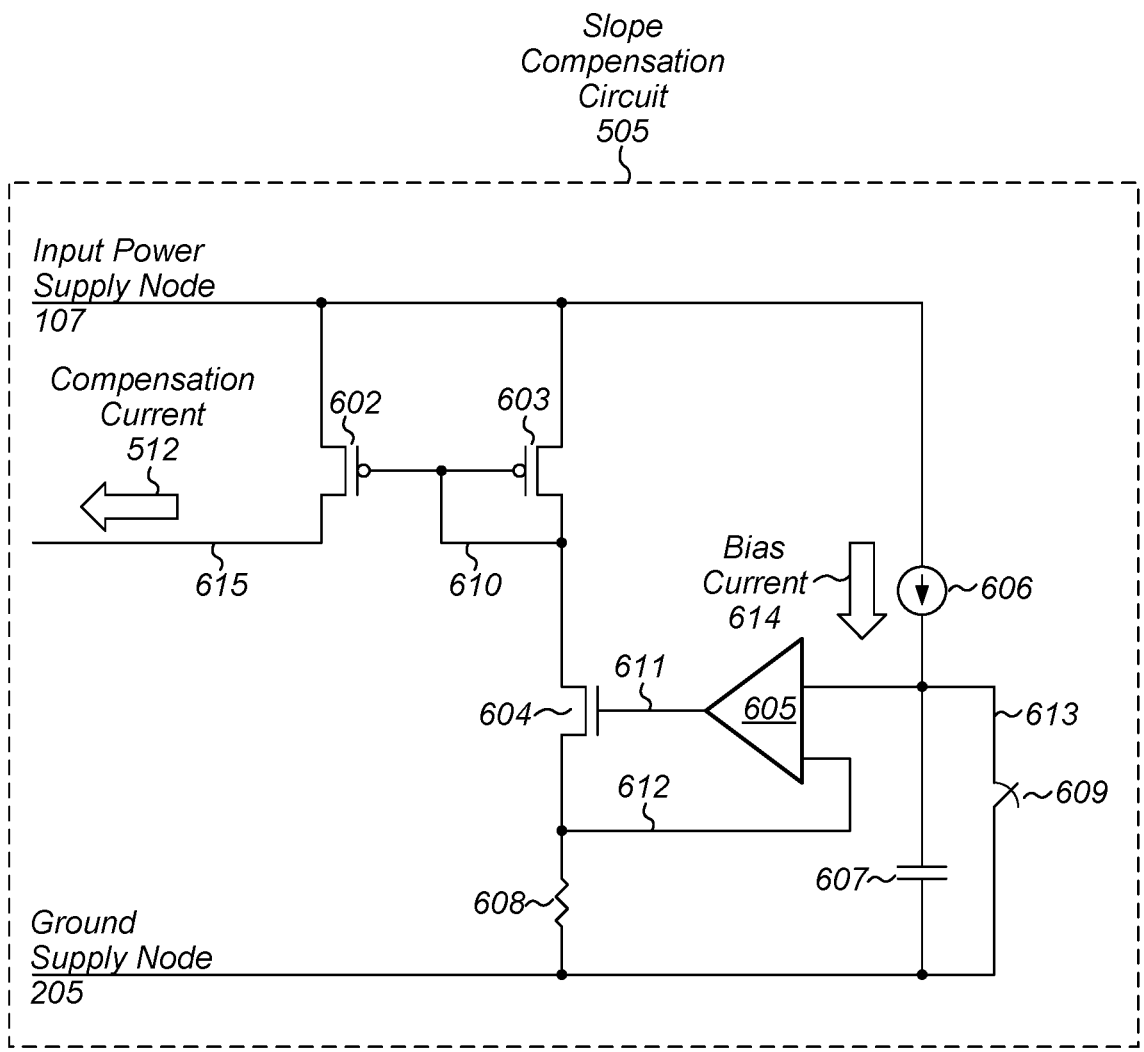
FIG. 6 is a block diagram of an embodiment of a slope compensation circuit.

Turning to FIG. 6, a block diagram of an embodiment of slope compensation circuit 505 is depicted. As illustrated, slope compensation circuit 505 includes devices 602-604, amplifier circuit 605, current source 606, capacitor 607 and switch 609.

Switch 609 is coupled between node 613 and ground supply node 205. In various embodiments, switch 609 is configured to couple node 613 to ground in order to discharge capacitor 607 and reset the circuit at the end of an active cycle. In various embodiments, switch 609 may be implemented using one or more transistors coupled between node 613 and ground supply node 205, whose control terminals are coupled to a reset signal (not shown).

Current source 606 is coupled between input power supply node 107 and node 613, and is configured to generate bias current 614. In various embodiments, current source 606 may be implemented using a variety of circuit topologies including a supply and/or temperature independent reference circuit and one or more current mirror circuits.

Capacitor 607 is coupled between node 613 and ground supply node 205. When switch 609 is open, capacitor 607 is charged by bias current 614 generating a linearly increasing voltage level on node 613. In various embodiments, capacitor 607 may be implemented using a metal-oxide-metal (MOM) structure, a metal-insulator-metal (MIM) structure, or any other suitable capacitor structure available in a semiconductor manufacturing process.

Device 604 is coupled between node 610 and node 612, and is controlled by a voltage level of node 611. Resistor 608 is coupled between node 612 and ground supply node 205. An output of amplifier circuit 605 is coupled to node 611, while the inputs of comparator circuit 605 are coupled to nodes 612 and 613.

In some embodiments, amplifier circuit 605, device 604, and resistor 608 form a voltage-to-current converter circuit configured to generate a current flowing in device 604 that is proportional to the voltage level of node 613. In various embodiments, comparator circuit 605 may be implemented as a differential amplifier circuit, while device 604 may be implemented as an n-channel MOSFET, FinFET, GAAFET, or any other suitable transconductance device. Resistor 608 may, in some embodiments, be implemented using polysilicon, metal, or any other suitable material available in a semiconductor manufacturing process.

Device 603 is coupled between input power supply node 107 and node 610, and is controlled by a voltage level of node 610. In a similar fashion, device 602 is coupled between input power supply node 107 and node 615, and is controlled by the voltage level of node 610. In various embodiments, devices 602 and 603 form a current mirror circuit configured to replicate a current flowing through device 604, which also flows through device 603, into a current flowing in device 602 to generate compensation current 512 in node 615. It is noted that a magnitude of the compensation current 512 may be modified by changing one or more physical parameters (e.g., width) of device 602 relative to the physical parameters of device 603. In various embodiments, devices 602 and 603 may be implemented as p-channel MOSFETs, FinFETs, GAAFETs, or any other suitable transconductance device.

Figure 7:
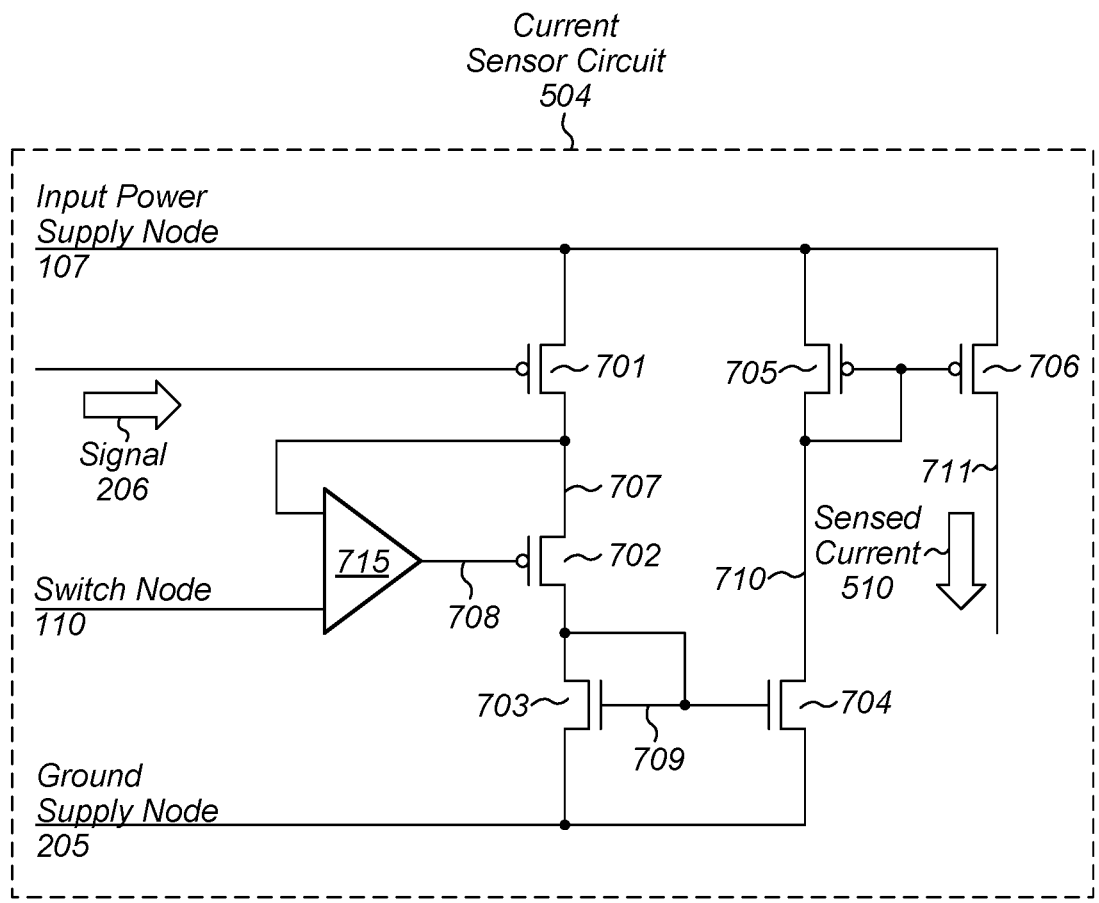
FIG. 7 is a block diagram of an embodiment of a current sensor circuit.

Turning to FIG. 7, a block diagram of an embodiment of current sensor circuit 504 is depicted. As illustrated, current sensor circuit 504 includes devices 701-706, and amplifier circuit 715.

Device 701 is coupled between input power supply node 107 and node 707, and is controlled by signal 206. In various embodiments, device 701 may be a replica, or a scaled replica, of device 201 included in switching circuit 102. Device 701 may, in some embodiments, be implemented as a p-channel MOSFET, FinFET, GAAFET, or any other suitable transconductance device.

Amplifier circuit 715 is configured to compare a voltage level of node 707 to a voltage level of switch node 110 to generate a voltage on node 708. In various embodiments, comparator circuit 715 is configured to generate the voltage on node 708 such that a magnitude of the voltage on node 708 corresponds to an amplified difference between the voltage level of node 707 and switch node 110. In various embodiments, comparator circuit 715 may be implemented as a differential amplifier circuit or any other suitable amplifier circuit configured to generate an output signal whose voltage level is based on a comparison of respective voltage levels of two or more input signals.

Device 702 is coupled between node 707 and node 709 and is controlled by the voltage of node 708. The current flowing in device 702 may, in various embodiments, correspond to a current flowing in inductor 104 during an active cycle. Device 702 may, in some embodiments, be implemented as a p-channel MOSFET, FinFET, GAAFET, or any other suitable transconductance device.

Device 703 is coupled between node 709 and ground supply node 205, and is controlled by a voltage level of node 709. It is noted that the current flowing through device 702 also flows through device 703. Device 704 is coupled between node 710 and ground supply node 205, and is controlled by the voltage level of node 709. In various embodiments, devices 703 and 704 form a current mirror circuit configured to generate a replica of the current flowing in device 703 into a current flowing in device 704. It is noted that a magnitude of the current flowing in device 704 may be modified by changing one or more physical parameters (e.g., width) of device 704 relative to the physical parameters of device 703. Devices 703 and 704 may, in some embodiments, be implemented as n-channel MOSFETs, FinFETS, GAAFETs, or any other suitable transconductance devices.

Device 705 is coupled between input power supply node 107 and node 710, and is controlled by a voltage level of node 710. It is noted that the current flowing in device 704 also flows through device 705. Device 706 is coupled between input power supply node 107 and node 711, and is controlled by the voltage level of node 710. In various embodiments, devices 705 and 706 form a current mirror circuit configured to generate a replica of the current flowing in device 705 in to a current flowing in device 706 to generate sensed current 510. It is noted that a magnitude of sensed current 510 may be modified by changing one or more physical parameters (e.g., width) of device 706 relative to the physical parameters of device 705. Devices 705 and 706 may, in some embodiments, be implemented as p-channel MOSFETs, FinFETS, GAAFETs, or any other suitable transconductance devices.

Figure 8:
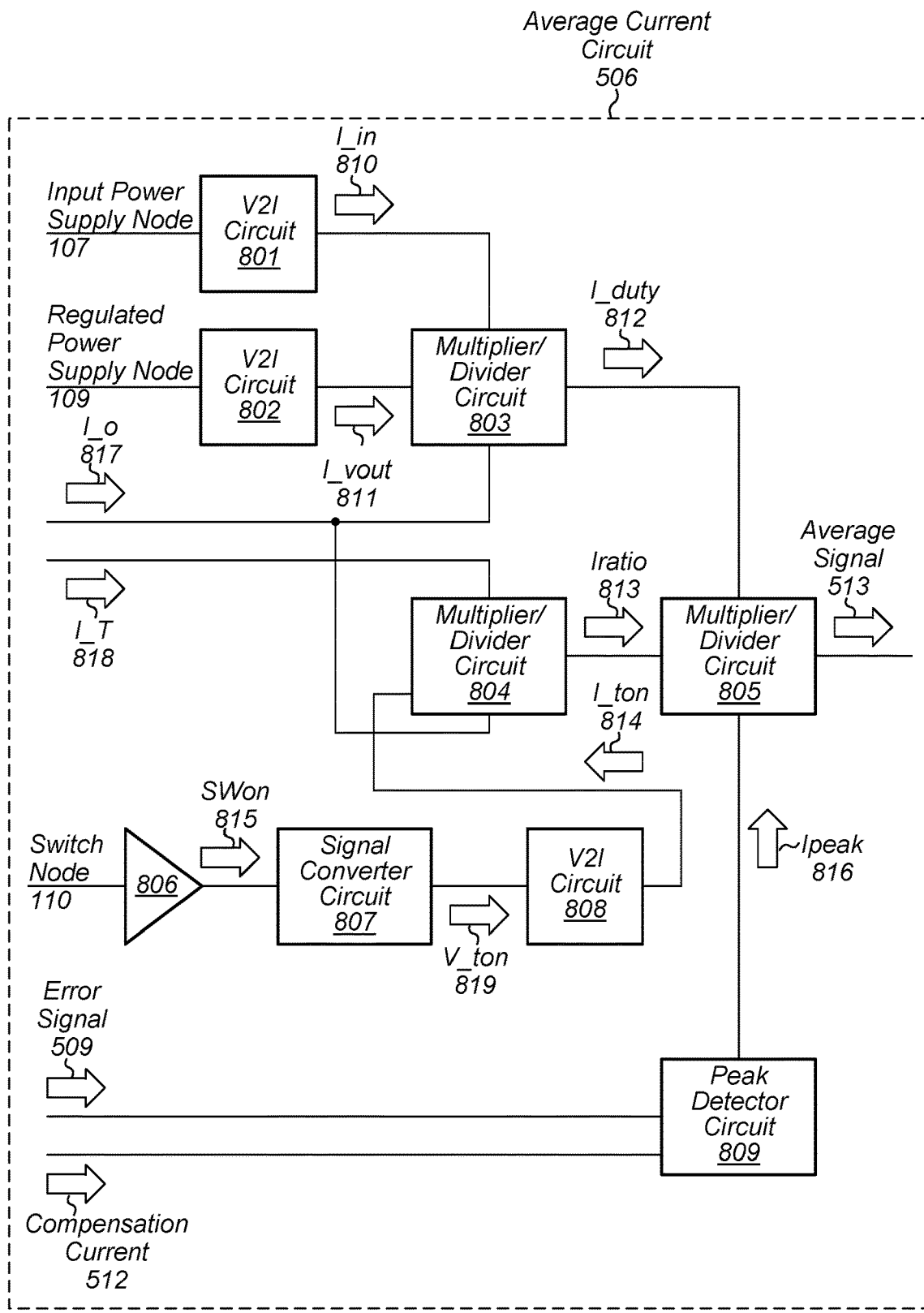
FIG. 8 is a block diagram of an embodiment of an average current circuit.

Turning to FIG. 8, a block diagram of an embodiment of average current circuit 506 is depicted. As illustrated, average current circuit 506 includes three voltage-to-current circuits (denoted as "V2I circuit 801," "V2I circuit 802," and "V2I circuit 808"), Multiplier/Divider circuits 803-805, buffer circuit 806, signal converter circuit 807, and peak detector circuit 809.

V2I circuit 801 is configured to generate current I_in 810 using a voltage level of input power supply node 107. In various embodiments, a magnitude of current I_in 810 may be proportional to the voltage level of input power supply node 107. In a similar fashion, V2I circuit 802 is configured to generate current I_vout 811 using a voltage level of regulated power supply node 109.

Multiplier/divider circuit 803 is configured to generate current I_duty 812 using current I_vout 811, current I_in 810, and current I_o 817. It is noted that, in various embodiments, current I_o 817 may corresponding to charge current 113. To generate current I_duty 812, multiplier/divider circuit 803 may be further configured to multiply current I_o 817 by the quotient of currents I_vout 811 and I_in 810.

Buffer circuit 806 is configured to generate SWon 815 using an on-time of switch node 110. In various embodiments, buffer circuit 806 may be implemented as a pair of inverter gates, or any other comparator.

Signal converter circuit 807 is configured to generate V_ton 819 using SWon 815. In various embodiments, signal converter circuit 807 may be implemented as a time-to-analog converter circuit. In such cases, a magnitude of V_ton 819 corresponds to the on-time of SWon 815 transitions.

V2I circuit 808 is configured to generate current I_ton 814 using V_ton 819. In various embodiments, a magnitude of current I_ton 814 may be proportional to the on-time of switch node 110.

Multiplier/divider circuit 804 is configured to generate current Iratio 813 using current I_T 818, current I_ton 814, and current I_o 817. It is noted that, in various embodiments, current I_T 818 may correspond period of a particular one of active cycles 112. To generate current I ratio 813, multiplier/divider circuit 804 may be further configured to multiply current I_o 817 by the quotient of currents I_ton 814 and I_T 818.

Multiplier/divider circuit 805 is configured to generate average signal 513 using current I_duty 812, current Iratio 813, and current Ipeak 816. To generate average signal 513, multiplier/divider circuit 805 may be further configured to multiply current Ipeak 816 by the quotient of currents I_duty 812 and Iratio 813. It is noted that multiplier/divider circuit 805 may be configured to generate a current corresponding to average signal 513, and a voltage version of average signal 513 may be generated using the current and a resistor (not shown).

Peak detector circuit 809 is configured to generate current Ipeak 816 using error signal 509 and compensation current 512. As described below, peak detector circuit 809 may be further configured to sample compensation current 512 and use a sampled versioned of compensation current 512 in conjunction with a sampled version of error signal 509 to generate current Ipeak 816. In various embodiments, peak detector circuit 809 may be configured to sample compensation current 512 and error signal 509 using one or more signals based on SWon 815.

In one embodiment, the average current may be calculated using the following equation:

$$I_{avg}(\text{out}) = \frac{I_{peak}}{2} \cdot \frac{t_{on}}{T} \cdot \frac{V_{IN}}{V_{out}}.$$

where $I_{peak}$ is the peak current, $t_{on}$ is the on time of the high side switch, T is the switching period, $V_{IN}$ is the input voltage and $V_{OUT}$ is the output voltage. The calculations performed using the equation above may be valid for discontinuous current mode (DCM) operation, as mode transitions may be desirable at light loads to maintain the performance of the switching regulator.

Figure 9:
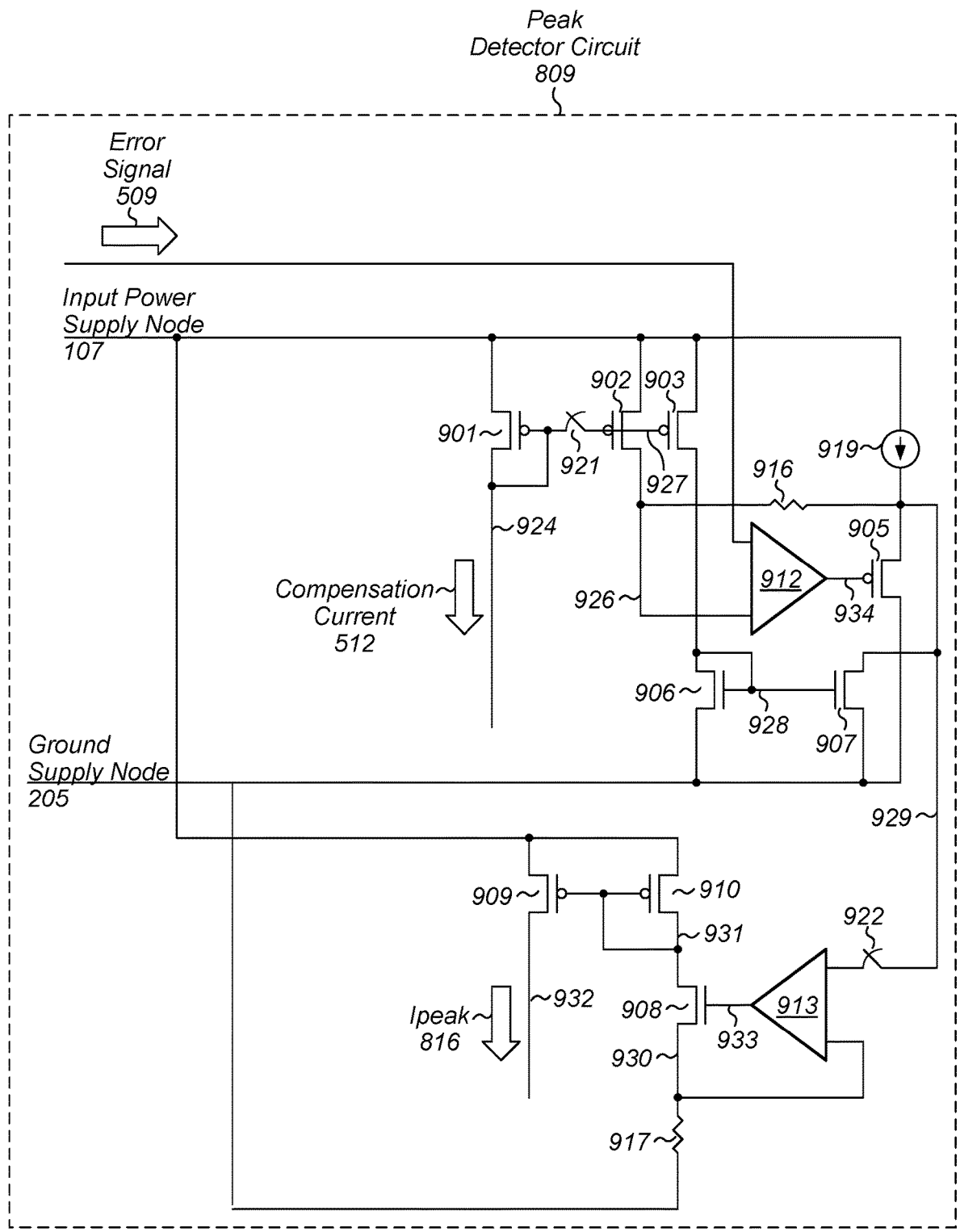
FIG. 9 is a block diagram of an embodiment of a peak current detection circuit.

Turning to FIG. 9, a block diagram of an embodiment of peak detector circuit 809 is depicted. As illustrated, peak detector circuit 809 includes devices 901-910, amplifiers 912 and 913, current source 919, resistors 916 and 917, and switches 921-922.

Device 901 is coupled between input power supply node 107 and node 924, and is controlled by a voltage level of node 924. In various embodiments, node 924 is coupled to slope compensation circuit 505 such that compensation current 512 flows in device 901.

Switch 921 is coupled between node 924 and node 927. In various embodiments, switch 921 is configured to couple node 924 to node 927 in response to a detection of a falling edge of PWM signal 307.

Device 902 is coupled between input power supply node 107 and node 926, and is controlled by a voltage level of node 927. Device 903 is coupled between input power supply node 107 and node 928, and is controlled by the voltage level of node 927. When switch 921 is closes, devices 901-903 function as a current mirror, sampling compensation current 512, such that replicas of compensations current 512 flow in devices 902 and 903, respectively.

Device 906 is coupled between node 928 and ground supply node 205, and is controlled by a voltage level of node 928. Device 907 is coupled between node 929 and ground supply node 205, and is controlled by the voltage level of node 928. Devices 906 and 907 function as a current mirror configured to generate a replica of the current flowing in device 906 in device 907.

Amplifier 912 is configured to generate a voltage on node 934 using error signal 509 and a voltage level of node 926. In various embodiments, a magnitude of the voltage generated on node 934 is proportional to a difference between the voltage level of error signal 509 and the voltage level of node 926.

Current source 919 is coupled between input power supply node 107 and node 929. In various embodiments, current source 919 is configured to source a bias current into node 929. Current source 919 may, in some embodiments, be implemented as biased transconductance device (e.g., a p-channel MOSFET, FinFET, or GAAFET), part of a current mirror circuit, or any other suitable circuit configured to provide a constant current across a range of output voltage levels.

Device 905 is coupled between node 929 and ground supply node 205, and is controlled by a voltage level of node 924. In various embodiments, the voltage level of node 934 causes a current to flow through device 905 that is proportional to the difference between the voltage level of error signal 509 and the voltage level of node 926.

Resistor 916 is coupled between node 926 and node 926, allowing a current to flow between the two nodes. The current flowing in resistor 916, the bias current generated by current source 919, and the current flowing in devices 905 and 907 are all combined on node 929.

Switch 922 is coupled between node 929 and an input of amplifier 913. Switch 922 is configured to couple node 929 to the input of comparator 913 in response to a detection of a rising edge of PWM signal 307, sampling a voltage of node 929 generated by the combination of the current flowing in resistor 916, the bias current generated by current source 919, and the current flowing in devices 905 and 907.

Amplifier 913 is configured to generate a voltage on node 933 using the sampled voltage of node 929 and a voltage of node 930. Device 908 is coupled between node 931 and node 930, and is controlled by the voltage level of node 933. Resistor 917 is coupled between node 930 and ground supply node 205. In various embodiments, the combination of amplifier 913, device 908, and resistor 917 function as a voltage-to-current converter circuit configured to translate the sample voltage of node 929 to a current flowing in device 908.

Device 909 is coupled between input power supply node 107 and node 932, and is controlled by a voltage level of node 931. Device 910 is coupled between input power supply node 107 and node 931, and is controlled by the voltage level of node 931. Devices 909 and 910 function as a current mirror circuit configured to replicate the current flowing in device 910 in device 909 to generate current Ipeak 816.

Switches 921 and 922 may be implemented using one or more transistors or other suitable switching devices. For example, in some embodiments, switches 921 and 922 may be implemented using pass-gate or other similar circuits. Resistors 916 and 917 may be implemented using polysilicon, metal or any other suitable material available in a semiconductor manufacturing process. Amplifiers 912 and 913 may be implemented as differential amplifiers or any other suitable amplifier circuit configured to generate an output signal whose voltage level is based on the respective voltage levels of two or more input signals. Devices 901-905 and devices 909-910 may be implemented as p-channel MOSFETs, FinFETs, GAAFETs, or any other suitable transconductance devices. Devices 906-908 may be implemented as n-channel MOSFETs, FinFETs, GAAFETs, or any other suitable transconductance devices.

Figure 10:
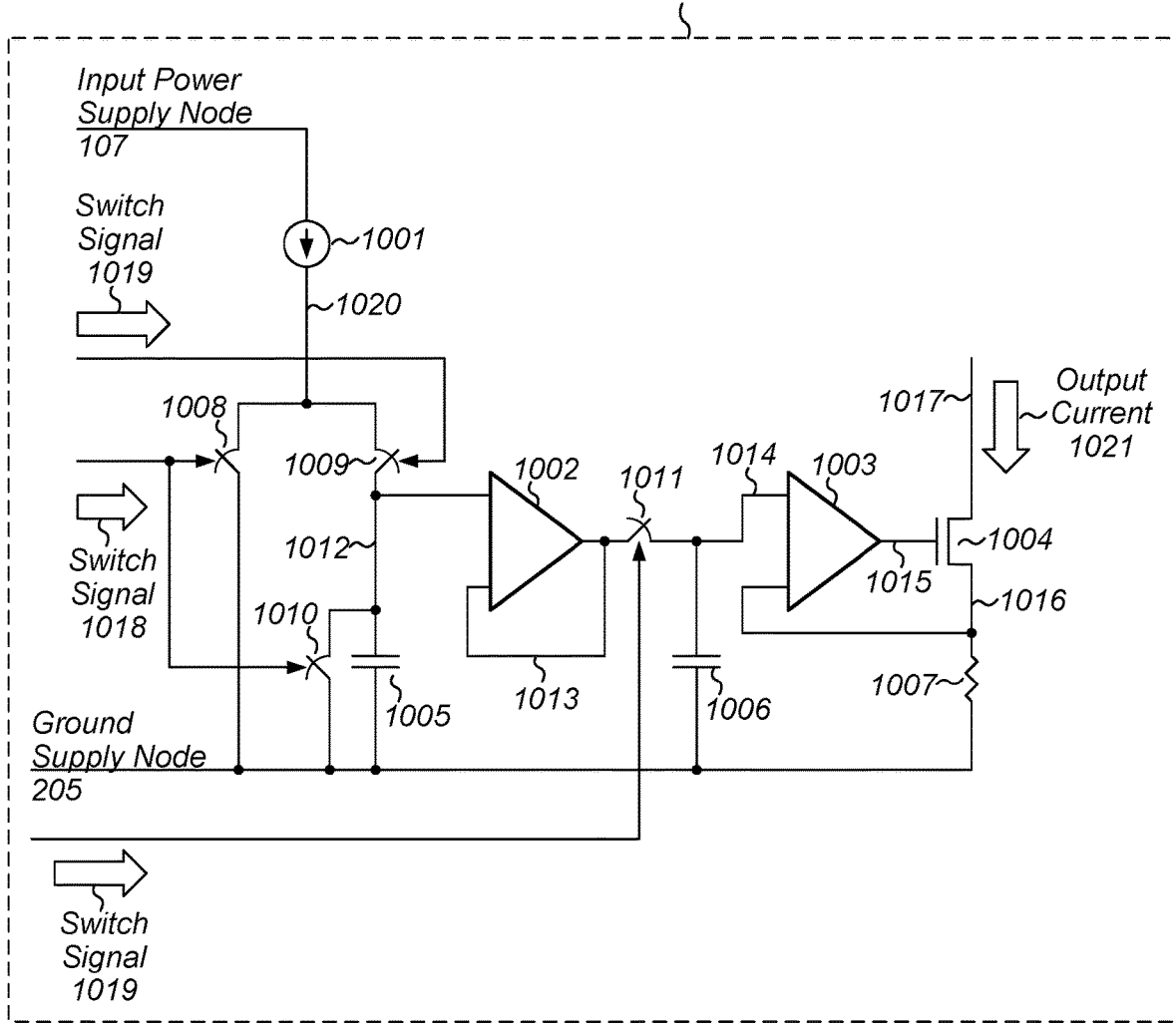
FIG. 10 is a block diagram of an embodiment of a signal conversion circuit.

Turning to FIG. 10, a block diagram of an embodiment of signal converter circuit 807 is depicted. As illustrated, signal converter circuit 807 included current source 1001, amplifiers 1002 and 1003, device 1004, capacitors 1005 and 1006, resistor 1007, and switches 1008-1010.

Current source 1001 is coupled between input power supply node 107 and node 1020, and is configured to source a bias current into node 1020. Current source 919 may, in some embodiments, be implemented as biased transconductance device (e.g., a p-channel MOSFET, FinFET, or GAAFET), part of a current mirror circuit, or any other suitable circuit configured to provide a constant current across a range of output voltage levels.

Switch 1008 is configured to couple node 1020 to ground supply node 205 in response to an activation of switch signal 1018. Switch 1009 is configured to couple node 1020 to node 1012 in response to an activation of switch signal 1019. In a similar fashion, switch 1010 is configured to couple node 1012 to ground supply node 205 in response to an activation of switch signal 1018.

It is noted that switch signals 1018 and 1019 have opposite polarity. In various embodiments, switch signal 1018 and switch signal 1019 may be based on a signal whose transitions in time are to be converted to an analog voltage level. For example, switch signals 1018 and 1019 may be based on SWon 815 as depicted in FIG. 8.

Capacitor 1005 is coupled between node 1012 and ground supply node 205. During periods of time when switch 1009 is closed and switch 1010 is open, capacitor 1005 is charged by the bias current generated by current source 1001 performing an integration function. Capacitor 1005 may, in various embodiments, be implemented using a MOM structure, a MIM structure, or any other suitable capacitor structure available on a semiconductor manufacturing process.

Amplifier 1002 is coupled between nodes 1012 and 1013, and is configured to buffer a voltage level of node 1012 onto node 1013. Switch 1011 is coupled between node 1013 and 1014 and is configured to couple node 1013 to 1014 in response to activation of switch signal 1019. Capacitor 1006 is coupled between node 1014 and ground supply node 205. In various embodiments, the voltage level of node 1013 is stored on capacitor 1006 when switch 1011 is closed. Capacitor 1006 may, in various embodiments, be implemented using a MOM structure, a MIM structure, or any other suitable capacitor structure available on a semiconductor manufacturing process.

Amplifier 1003 is configured to generate a voltage on node 1015 based on the respective voltage levels of nodes 1014 and 1016. Device 1004 is coupled between node 1017 and node 1016, and is controlled by a voltage level of node 1015. Resistor 1007 is coupled between node 1016 and ground supply node 205. In various embodiments, the combination of amplifier 1003, device 1004, and resistor 1007 function as a voltage-to-current converter circuit configured to translate the voltage level of node 1014 to a current flowing in device 1004 to generate output current 1021 whose value is based on the switching rate of switch signals 1018 and 1019. It is noted that in some embodiments, output current 1021 may be passed through a resistor to generate a voltage whose value is based on the switching rate of switch signals 1018 and 1019.

Switches 1008-1011 may be implemented using one or more transistors or other suitable switching devices. For example, in some embodiments, switches 1008-1011 may be implemented using pass-gate or other similar circuits. Amplifiers 1002 and 1003 may be implemented as differential amplifiers or any other suitable comparator circuit configured to generate an output signal whose voltage level is based on the respective voltage levels of two or more input signals. Resistor 1007 may be implemented using polysilicon, metal or any other suitable material available in a semiconductor manufacturing process.

Figure 11A:
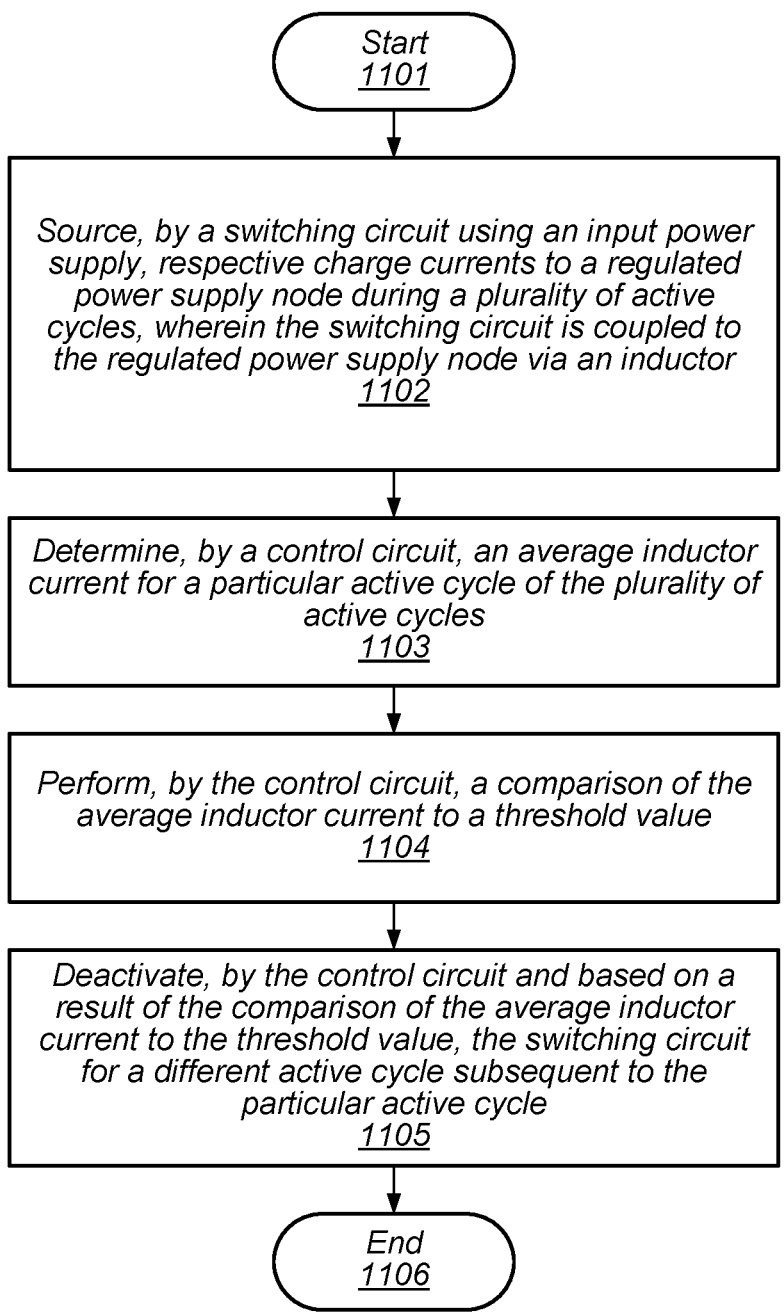
FIG. 11A is a block diagram of an embodiment of a method for operating a power converter circuit.

A flow diagram depicting an embodiment of a method for operating a power converter circuit is illustrated in FIG. 11A. The method, which may be applied to various power converter circuits, such as power converter circuit 100, begins in block 1101.

The method includes sourcing, by a switching circuit using an input power supply, respective charge currents to a regulated power supply node during a plurality of active cycles. In various embodiments, the switching circuit is coupled to the regulated power supply node via an inductor (block 1102). In various embodiments, sourcing a given charge current to the regulated power supply node includes coupling, by a switch device included in the switching circuit, a terminal of the inductor to the input power supply.

The method further includes determining, by a control circuit, an average inductor current for a particular active cycle of the plurality of active cycles (block 1103). In various embodiments, determining the average inductor current includes determining, by the control circuit, the average inductor current using a voltage level of the regulated power supply node, a peak current flowing in the inductor during the particular active cycle, and a duty cycle of a high-side switch included in the switching circuit, wherein the high-side switch is coupled between the input power supply node and the inductor.

The method also includes performing, by the control circuit, a comparison of the average inductor current to a threshold value (block 1104). In various embodiments, the method may further include comparing, by the control circuit, a skip voltage corresponding to the average inductor current to the threshold value, and activating a skip signal in response to determining the skip voltage is greater than the threshold value.

The method further includes deactivating, by the control circuit and based on a result of the comparison of the average inductor current to the threshold value, the switching circuit for a different active cycle of the plurality of active cycles that is subsequent to the particular active cycle (block 1105). In some embodiments, the method further includes deactivating the switching circuit in response to determining the skip signal has been activated.

In some embodiments, the method may also include switching from a pulse width modulation (PWM) mode to a pulse frequency mode (PFM) in response to determining that a load current is at a first value, and switching from the PFM mode to the PWM mode in response to determining that the load current is at a second value greater than the first value.

In other embodiment, the method may further include sensing a current flowing in the inductor and combining the current flowing in the inductor with a compensation current to generate a sense signal. The method may also include generating an error signal using a voltage level of the regulated power supply node and a reference voltage. In some embodiments, the method may further include performing a comparison of the sense signal to the error signal, and halting a given active cycle of the plurality of active cycles using a result of the comparison. The method concludes in block 1106.

Figure 11B:
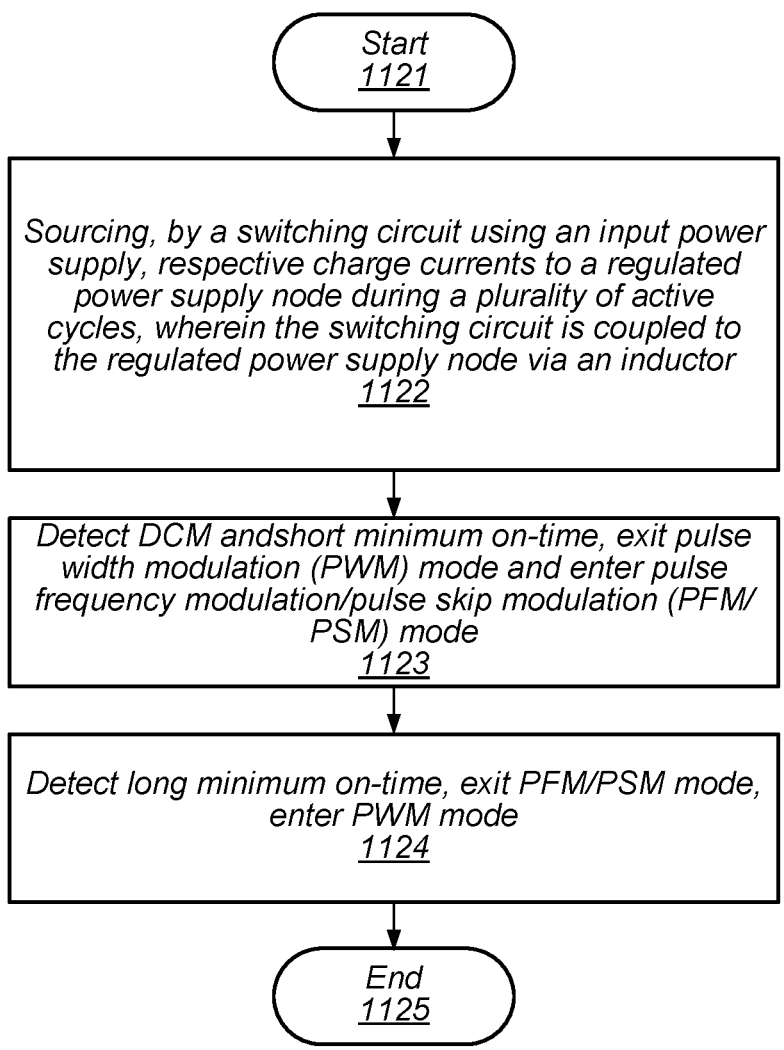
FIG. 11B is a block diagram of another embodiment of a method for operating a power converter circuit.

FIG. 11B is a block diagram of another embodiment of operating a power converter circuit. The method performed in FIG. 11B may be carried out by various embodiments of the circuitry discussed above. The method includes sourcing, by a includes sourcing, by a switching circuit using an input power supply, respective charge currents to a regulated power supply node during a plurality of active cycles. In various embodiments, the switching circuit is coupled to the regulated power supply node via an inductor (block 1122). During operation, an on-time of the switching circuit and a discontinuous conduction mode (DCM) may be monitored as a basis for determining mode changes. The method thus further includes (while operating in the PWM mode) detecting DCM and a short minimum on-time, and in response thereto, causing the power converter to exit a PWM mode and enter a PFM/PSM mode (block 1123). The method further includes detecting (while in the PFM/PSM mode), a long minimum on-time, and in response thereto, exiting the PFM/PSM mode and entering the PWM mode (block 1124).

Figure 12:
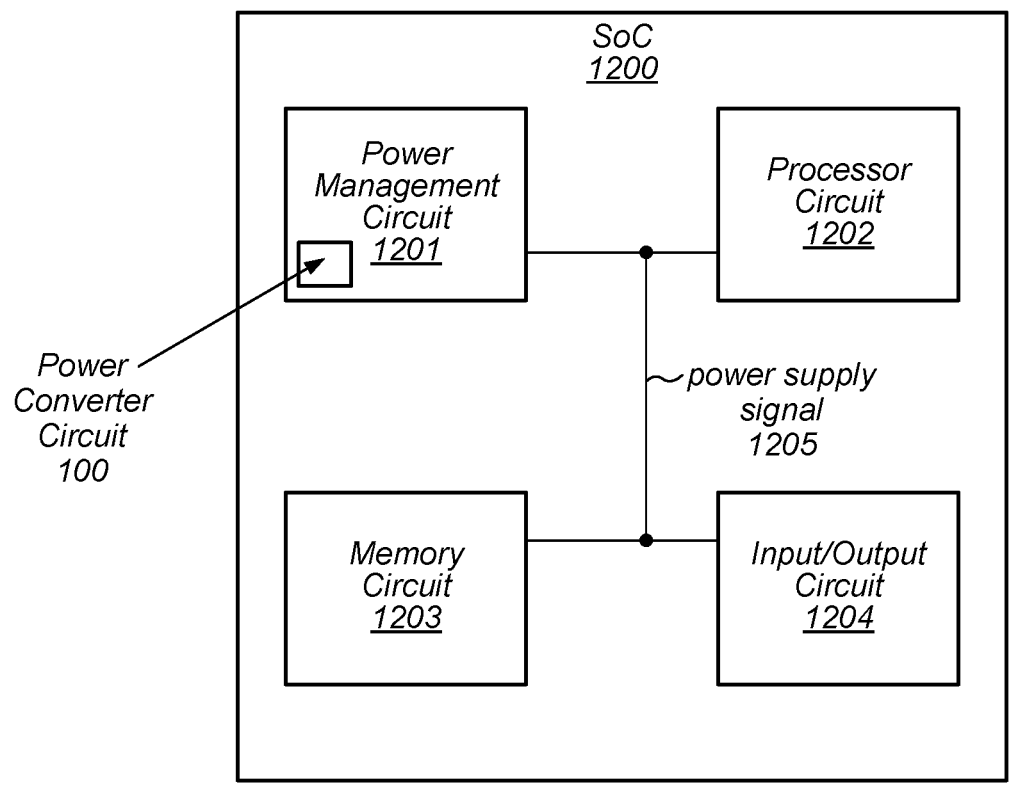
FIG. 12 is a block diagram of one embodiment of a system-on-a-chip that includes a power management circuit.

A block diagram of a system-on-a-chip (SoC) is illustrated in FIG. 12. In the illustrated embodiment, SoC 1200 includes power management circuit 1201, processor circuit 1202, input/output circuits 1204, and memory circuit 1203, each of which is coupled to power supply signal 1205. In various embodiments, SoC 1200 may be configured for use in a desktop computer, server, or in a mobile computing application such as, e.g., a tablet, laptop computer, or wearable computing device.

Power management circuit 1201 includes power converter circuit 100 which is configured to generate a regulated voltage level on power supply signal 1205 in order to provide power to processor circuit 1202, input/output circuits 1204, and memory circuit 1203. Although power management circuit 1201 is depicted as including a single power converter circuit, in other embodiments, any suitable number of power converter circuits may be included in power management circuit 1201, each configured to generate a regulated voltage level on a respective one of multiple internal power supply signals included in SoC 1200.

Processor circuit 1202 may, in various embodiments, be representative of a general-purpose processor that performs computational operations. For example, processor circuit 1202 may be a central processing unit (CPU) such as a microprocessor, a microcontroller, an application-specific integrated circuit (ASIC), or a field-programmable gate array (FPGA).

Memory circuit 1203 may, in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 12, in other embodiments, any suitable number of memory circuits may be employed.

Input/output circuits 1204 may be configured to coordinate data transfer between SoC 1200 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1204 may be configured to implement a version of Universal Serial Bus (USB) protocol or IEEE 1394 (Firewire®) protocol.

Input/output circuits 1204 may also be configured to coordinate data transfer between SoC 1200 and one or more devices (e.g., other computing systems or integrated circuits) coupled to SoC 1200 via a network. In one embodiment, input/output circuits 1204 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1204 may be configured to implement multiple discrete network interface ports.

Figure 13:
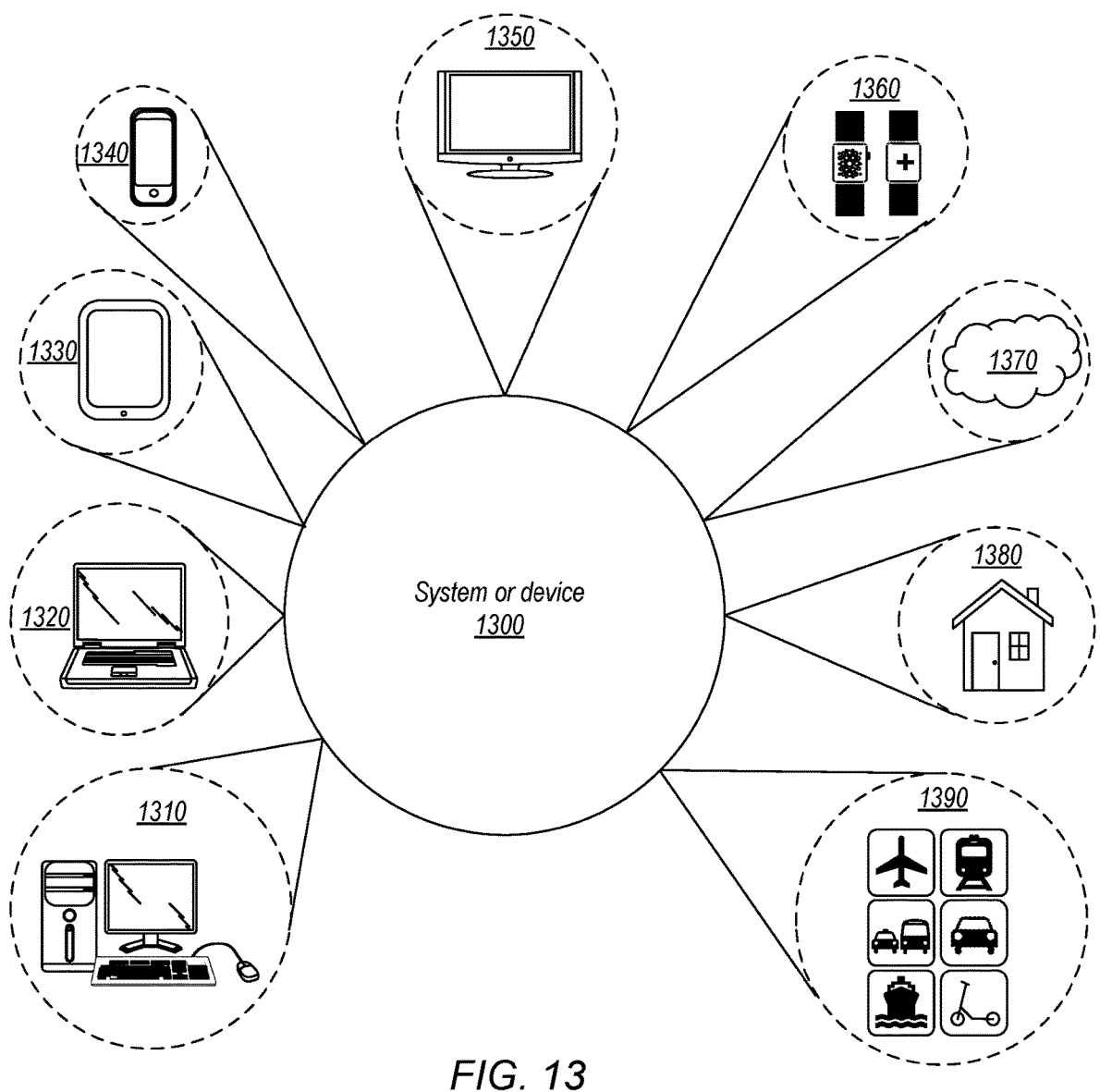
FIG. 13 is a block diagram of various embodiments of computer systems that may include power converter circuits.

Turning now to FIG. 13, various types of systems that may include any of the circuits, devices, or systems discussed above are illustrated. System or device 1300, which may incorporate or otherwise utilize one or more of the techniques described herein, may be utilized in a wide range of areas. For example, system or device 1300 may be utilized as part of the hardware of systems such as a desktop computer 1310, laptop computer 1320, tablet computer 1330, cellular or mobile phone 1340, or television 1350 (or set-top box coupled to a television).

Similarly, disclosed elements may be utilized in a wearable device 1360, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1300 may also be used in various other contexts. For example, system or device 1300 may be utilized in the context of a server computer system, such as a dedicated server or on shared hardware that implements a cloud-based service 1370. Still further, system or device 1300 may be implemented in a wide range of specialized everyday devices, including devices 1380 commonly found in the home such as refrigerators, thermostats, security cameras, etc. The interconnection of such devices is often referred to as the "Internet of Things" (IoT). Elements may also be implemented in various modes of transportation. For example, system or device 1300 could be employed in the control systems, guidance systems, entertainment systems, etc. of various types of vehicles 1390.

The applications illustrated in FIG. 13 are merely exemplary and are not intended to limit the potential future applications of disclosed systems or devices. Other example applications include, without limitation: portable gaming devices, music players, data storage devices, unmanned aerial vehicles, etc.

Figure 14:
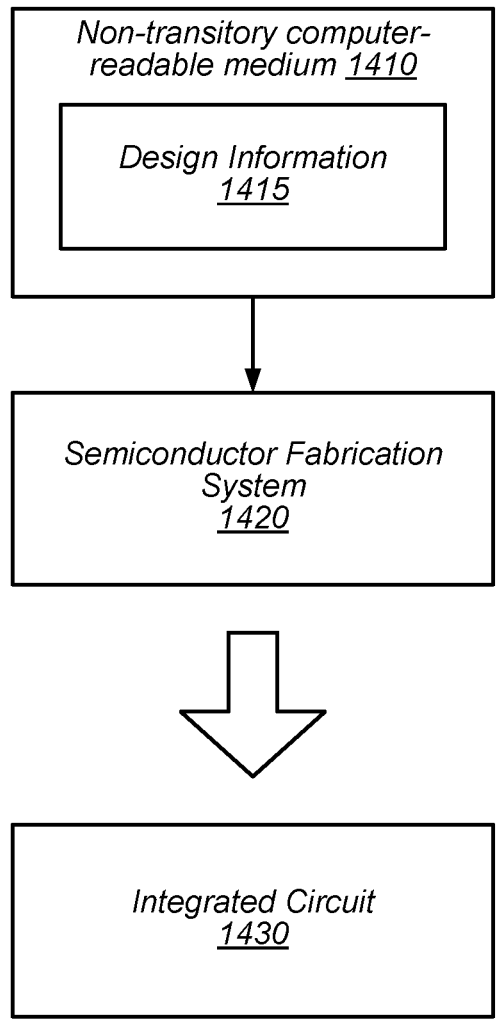
FIG. 14 illustrates an example of a non-transitory computer-readable storage medium that stores circuit design information.

FIG. 14 is a block diagram illustrating an example of a non-transitory computer-readable storage medium that stores circuit design information, according to some embodiments. In the illustrated embodiment, semiconductor fabrication system 1420 is configured to process design information 1415 stored on non-transitory computer-readable storage medium 1410 and fabricate integrated circuit 1430 based on design information 1415.

Non-transitory computer-readable storage medium 1410, may comprise any of various appropriate types of memory devices or storage devices. Non-transitory computer-readable storage medium 1410 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as Flash, magnetic media, e.g., a hard drive, or optical storage; registers, or other similar types of memory elements, etc. Non-transitory computer-readable storage medium 1410 may include other types of non-transitory memory as well or combinations thereof. Non-transitory computer-readable storage medium 1410 may include two or more memory mediums, which may reside in different locations, e.g., in different computer systems that are connected over a network.

Design information 1415 may be specified using any of various appropriate computer languages, including hardware description languages such as, without limitation: VHDL, Verilog, SystemC, SystemVerilog, RHDL, M, MyHDL, etc. Design information 1415 may be usable by semiconductor fabrication system 1420 to fabricate at least a portion of integrated circuit 1430. The format of design information 1415 may be recognized by at least one semiconductor fabrication system, such as semiconductor fabrication system 1420, for example. In some embodiments, design information 1415 may include a netlist that specifies elements of a cell library, as well as their connectivity. One or more cell libraries used during logic synthesis of circuits included in integrated circuit 1430 may also be included in design information 1415. Such cell libraries may include information indicative of device or transistor level netlists, mask design data, characterization data, and the like, of cells included in the cell library.

Integrated circuit 1430 may, in various embodiments, include one or more custom macrocells, such as memories, analog or mixed-signal circuits, and the like. In such cases, design information 1415 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1420 may also be configured to perform various testing of fabricated circuits for correct operation.

In various embodiments, integrated circuit 1430 is configured to operate according to a circuit design specified by design information 1415, which may include performing any of the functionality described herein. For example, integrated circuit 1430 may include any of various elements shown or described herein. Further, integrated circuit 1430 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to," An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of U.S. patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
 a switching circuit coupled to an input power supply node and a regulated power supply node via an inductor, wherein the switching circuit is configured to source respective charge current to the regulated power supply node during a plurality of active cycles; and
 a control circuit configured to:
  determine, for a particular active cycle, an average inductor current, wherein to determine the average inductor current, the control circuit is further configured to determine the average inductor current using a voltage level of the input power supply node, a voltage level of the regulated power supply node, a peak current flowing in the inductor, and a duty cycle of a high-side switch included in the switching circuit, wherein the high-side switch is coupled between the input power supply node and the inductor;
  perform a comparison of the average inductor current to a threshold value; and
  deactivate, based on results of the comparison, the switching circuit for a different active cycle subsequent to the particular active cycle.

2. The apparatus of claim 1, wherein in the control circuit is configured to generate an indication that conditions for operating in a pulse width modulation (PWM) mode have been met.

3. The apparatus of claim 2, further comprising a PWM comparator configured to compare a first voltage indicative of a load current demand to a second voltage indicative of a sensed inductor current with slope compensation.

4. The apparatus of claim 3, further comprising an error amplifier configured to generate the first voltage based on a voltage level of the regulated power supply node and a reference voltage.

5. The apparatus of claim 3, wherein the control circuit includes a sense circuit configured to generate the second voltage, and wherein the sense circuit includes an input coupled to a switching node of the switching circuit and an output coupled to provide the second voltage to the PWM comparator.

6. The apparatus of claim 5, further comprising a slope compensation circuit configured to modify the second voltage to provide the slope compensation.

7. The apparatus of claim 5, wherein the control circuit is configured to cause an exit from the PWM mode and entry into a pulse frequency modulation (PFM) mode in response to detecting operation in a discontinuous conduction mode with a minimum on-time pulse.

8. The apparatus of claim 5, wherein the control circuit is configured to cause a switch from the PWM mode to a pulse frequency modulation (PFM) mode at a first load current value and is further configured to cause a switch from the PFM mode to the PWM mode at a second load current value, wherein the second load current value is greater than the first load current value.

9. The apparatus of claim 3, further comprising a peak detector circuit configured to generate an indication of the peak current flowing through the inductor using the first voltage and a compensation current.

10. The apparatus of claim 1, further comprising a transition comparator configured to compare a skip voltage corresponding to the average inductor current to a threshold voltage corresponding to the threshold value, and further configured to activate a skip signal in response to the skip voltage exceeding the threshold voltage, wherein the control circuit is configured to deactivate the switching circuit for the different active cycle subsequent to the particular active cycle in response to assertion of the skip signal.

11. A method comprising:
sourcing, by a switching circuit using an input power supply node, respective charge currents to a regulated power supply node during a plurality of active cycles, wherein the switching circuit is coupled to the regulated power supply node via an inductor;
determining, by a control circuit, an average inductor current for a particular active cycle of the plurality of active cycles, wherein determining the average inductor current comprises the control circuit using a voltage level of the input power supply node, a voltage level of the regulated power supply node, a peak current flowing in the inductor, and a duty cycle of a high-side switch included in the switching circuit, wherein the high-side switch is coupled between the input power supply node and the inductor;
performing, by the control circuit, a comparison of the average inductor current to a threshold value; and
deactivating, by the control circuit and based on a result of the comparison, the switching circuit for a different active cycle of the plurality of active cycles, wherein the different active cycle is subsequent to the particular active cycle.

12. The method of claim 11, further comprising:
comparing, by the control circuit, a skip voltage corresponding to the average inductor current to the threshold value;
activating, by the control circuit, a skip signal in response to determining the skip voltage is greater than the threshold value; and
deactivating the switching circuit in response to determining the skip signal has been activated.

13. The method of claim 11, further comprising:
switching from a pulse width modulation (PWM) mode to a pulse frequency modulation (PFM) mode in response to determining that a load current is at a first value; and
switching from the PFM mode to the PWM mode in response to determining that the load current is at a second value, wherein the second value is greater than the first value.

14. The method of claim 11, further comprising:
sensing a current flowing in the inductor;
combining the current flowing in the inductor with a compensation current to generate a sense signal;
generating an error signal using a voltage level of the regulated power supply node and a reference voltage; and
performing a comparison of the sense signal to an error signal.

15. The method of claim 14, further comprising:
transitioning to a pulse frequency modulation/pulse skip modulation (PFM/PSM) mode using a result of the comparison.

16. The method of claim 11, further comprising:
generating, using the control circuit an indication that conditions for operating in a pulse width modulation (PWM) mode have been met, wherein the generating comprises a PWM comparator comparing a first voltage indicative of a load current demand to a second voltage indicative of a sensed inductor current with slope compensation.

17. A system comprising:
a load circuit configured to operate using a regulated supply voltage; and
a power converter configured to generate the regulated supply voltage on a supply voltage node, wherein the power converter includes:
a switching circuit including a high side switch and a low side switch coupled to one another at a switching node;
an inductor coupled between the switching node and the supply voltage node, wherein high side switch is configured to source respective charge current to the supply voltage node, via the inductor, during a plurality of active cycles; and
a control circuit configured to determine, for a particular active cycle, an average current through the inductor and further configured to deactivate, based on comparing the average current to a threshold value, the high side switch for an active cycle subsequent to the particular active cycle, wherein the control circuit is configured to determine the average current based on a voltage level of an input power supply node coupled to the high side switch, a voltage level on the supply voltage node, a peak current flowing in the inductor, and a duty cycle of the high side switch, wherein the high side switch is coupled between the input power supply node and the switching node.

18. The system of claim 17, wherein the control circuit includes a transition comparator configured to compare a first voltage corresponding to the average current through the inductor to a second voltage corresponding to the threshold value and further configured to generate a skip signal in response to the first voltage exceeding the second voltage, wherein the control circuit is configured to deactivate the high side switch in response to assertion of the skip signal.

19. The system of claim 17, wherein the control circuit is configured to cause the power converter to switch from operating in a pulse width modulation (PWM) mode to a pulse frequency modulation (PFM) mode in response to detecting a first load current value, and further configured to cause the power converter to switch operation from the PFM mode in response to detecting a second load current value, wherein the second load current value is greater than the first load current value.

20. The system of claim 17, wherein the control circuit is configured to generate an indication that conditions for operating in a pulse width modulation (PWM) mode have been met, wherein the system further includes a PWM comparator configured to compare a first voltage indicative of a load current demand to a second voltage indicative of a sensed inductor current with slope compensation.

* * * * *